Jan. 13, 1959  E. S. MURRAH  2,867,908
APPARATUS FOR MEASURING SHEARED LENGTHS
Filed Oct. 9, 1953  3 Sheets-Sheet 1

INVENTOR.
Edmund S. Murrah
BY
Norman S. Blodgett
Attorney

Jan. 13, 1959   E. S. MURRAH   2,867,908
APPARATUS FOR MEASURING SHEARED LENGTHS
Filed Oct. 9, 1953   3 Sheets-Sheet 3

INVENTOR.
Edmund S. Murrah
BY
Norman S. Blodgett
Attorney

United States Patent Office

2,867,908
Patented Jan. 13, 1959

2,867,908

APPARATUS FOR MEASURING SHEARED LENGTHS

Edmund S. Murrah, Worcester, Mass., assignor to Morgan Construction Company, Worcester, Mass., a corporation of Massachusetts Application October 9, 1953, Serial No. 385,112

6 Claims. (Cl. 33—141)

This invention relates generally to apparatus for measuring sheared lengths and more particularly to means for determining the lengths of pieces which have been sheared from the product of a rolling mill.

After a billet has passed through the successive stands of a rolling mill and emerges as a finished merchant bar or the like, it is necessary to cut it into smaller lengths. This may be necessary in order that it may be passed onto a cooling bed of limited length or because of the desire for accurate lengths for sale. Even when the product is sheared into cooling bed lengths, considerable accuracy is required, since it will eventually be cut into smaller lengths for sale, and inaccurate lengths in the initial cutting will result in scrap losses in the final cutting. Now, in the past few years, the delivery speed of the product from the final stand of the mill has become progressively greater. It is possible, by use of the electric flying shear, readily to cut this rapidly-moving product, but the difficulty presented lies in obtaining accurate measurements of the sheared length so that the shear can be adjusted to compensate for inaccuracies. This measurement must be made without interrupting the motion of the product and it must be possible to make measurements of succeeding sheared lengths whenever the operator so desires. Various means have been devised in the past for accomplishing these purposes, but they have all been lacking in one or more of the desirable qualities of such apparatus. The present invention obviates the shortcomings of the prior art in a novel manner.

It is therefore, an outstanding object of the invention to provide an extremely accurate apparatus for measuring sheared lengths of rolling mill product.

It is another object of this invention to provide a measuring apparatus which will indicate the lengths of any selected piece of sheared rolling mill product.

A further object of the present invention is the provision of a stock-measuring apparatus which is simple, rugged, and is capable of operating under practical steel mill conditions without breakdown or inaccuracy.

A still further object of the instant invention is the provision of a measuring apparatus of the type described which can indicate selectively either the length of a single piece or the total of the lengths of successive pieces.

Another object of the invention is the provision of apparatus for measuring lengths of moving rolling mill product simultaneously with the cutting thereof, thus permitting immediate adjustment of length.

With these and other objects in view, as will be apparent to those skilled in the art, the invention resides in the combination of parts set forth in the specification and covered by the claims appended hereto.

Referring to the drawings illustrating an embodiment of the invention and in which like reference numerals indicate like parts in the several figures, Figure 1 is a plan view of a portion of a rolling mill embodying the present invention, some of the apparatus being shown rather schematically.

Figure 1:
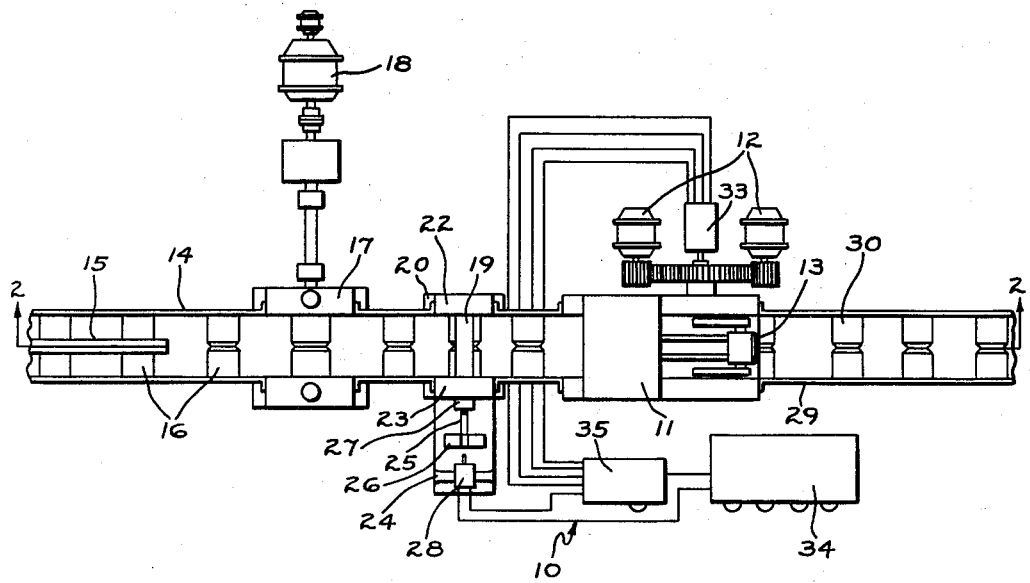
Figure 2:
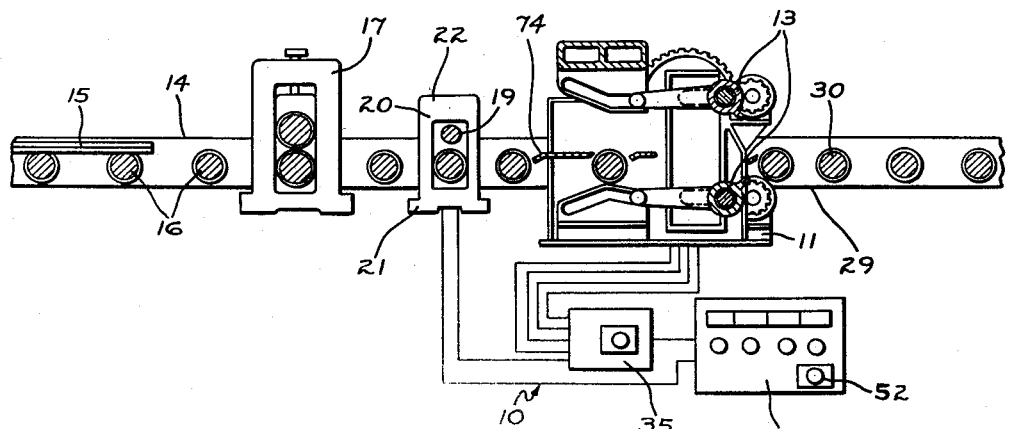
Figure 2 is an elevation sectional view of the portion of a rolling mill shown in Figure 1, taken on the line 2—2 of Figure 1.

Referring to Figure 1, wherein are best shown the general aspects of the invention, the measuring apparatus, indicated generally by the reference numeral 10, is shown in conjunction with a portion of a rolling mill including an electric flying shear 11. The shear 11 is driven by electric motors 12 and is provided with knives 13 which meet during a portion of their cycle of rotation. In order that these knives properly shear rolling mill product, it is necessary that they be moving at the same speed as the product at the moment of shearing. This may be done by providing that the shear remain stationary except during a cutting cycle, the shear being accelerated from rest to cutting speed and then being decelerated to rest after the cut. Such a shear is shown in the United States patent to Murrah, No. 2,500,999, issued March 21, 1950. Another way of accomplishing this purpose is to provide for the shear to run at a constant speed somewhere near the cutting speed and then to accelerate or decelerate it to cutting speed at the time of the cut; a shear apparatus making use of this concept is shown in the United States patent to Murrah, No. 2,425,484, issued August 12, 1947. Each of these methods of controlling the shear cycle permits of adjustment of the length of cut usually by adjustment of the length of acceleration or deceleration time or of the rate of acceleration or deceleration. In the present case, a flag 74 is activated by the product and starts the shear cycle. The present invention is adaptable to either type of shear.

The rolling mill is provided with an approach table 14 along which the product 15 moves in arriving at the shear. The table 14 comprises a series of rolls 16 which may be notched centrally to maintain the product on the centerline of the shear. Across the table 14, at some distance from the shear, is situated a mill stand 17 which is driven through the usual shafts and couplings by an electric motor 18. Between the mill stand and the shear is situated a measuring roll 19 which is adapted to contact and to be driven by the mill product as it passes to the shear. The roll is driven by a motor 30 at a speed which is a little below the bar speed; when the bar contacts the roller, the latter assumes bar speed. This roll is suitably mounted on a housing 20 which has an elongated base 21 which extends transversely of and under the table 14. From the base 21 extend vertical abutments 22, 23 and 24; abutment 22 lying on one side of the table 14, abutment 23 lying on the other side, and abutment 24 is situated on the same side of the table as abutment 24 and spaced therefrom. Extending axially from the measuring roll 19 is a takeoff shaft 25 on the outer end of which is keyed a notched disk 26 which will be described more completely hereinafter. This disk is situated between the abutments 23 and 24. On the side of the abutment 23 facing away from the table is mounted a light source 27 suitably connected to a source of electricity in order to direct a narrow horizontal stream of light toward the abutment 24. On the abutment 24 is mounted a photocell apparatus 28 which is aligned with the stream of light originating in the source 27. The light source 27 and the photocell apparatus are of the well-known type, the latter comprising a vacuum tube containing a light-sensitive element which produces a signal having a strength indicative of the intensity of light falling thereon and an amplifier which multiplies the strength of this signal to a usable value. The disk 26, the light source 27, and the photocell apparatus 28 constitute a pulse generator.

On the side of the shear 11 away from the table 14, is situated a back-shear table 29 having rolls 30. A controller 33, containing certain limit switches, is mounted coaxially with one of the crankshafts of the shear 11 and is driven thereby. An electronic counter 34 and a relay box 35 are preferably mounted adjacent the control apparatus for the shear, not shown. The electronic counter 34 is of a well-known type which counts pulses of electrical current which are introduced to its input terminals, the number of pulses since the last re-setting being shown on the face of the instrument. A re-set button 52, when pressed, returns the count indicator back to zero.

Figure 3:
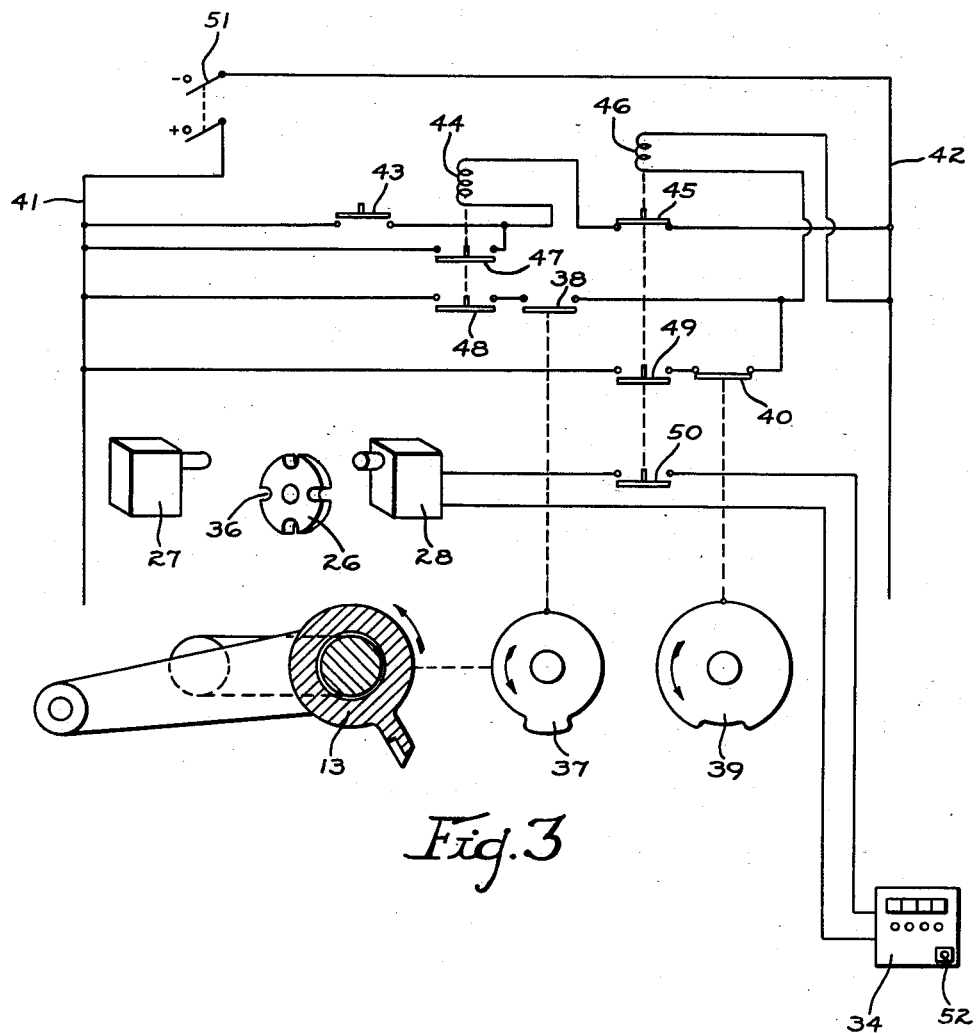
Figure 3 is a somewhat schematic view of certain electrical elements of the invention.

The electrical elements of the invention are best shown in Figure 3 where, for the purposes of clarity of presentation, no attempt is made to segregate the elements into their actual physical localities; it will be understood, however, that some of the elements will be situated in the controller 33, while others will be mounted in the relay box 35. The disc 26 is provided with a definite number of openings such as notches 36 and the disc is so mounted that a beam of light is permitted to pass from the source 27 to the photocell apparatus 28 only when a notch reaches the upper part of the disc as the latter is rotated by the measuring roll 19. The controller 33 contains a limit cam 37 which actuates a normally open contactor 38 to permit it to close only at the portion of the knife cycle at which cutting takes place. The controller also contains a limit cam 39 which operates a normally closed contactor 40 and permits it to open only at the instant of cutting. Two power lines 41 and 42 are connected through a main switch 51 to a source of direct current electricity. From the line 41 to the line 42 are connected a normally-open push button starter switch 43, the coil of a relay 44, and a contactor 45 of a relay 46 in series with each other and in the order named. From a point between the starter switch 43 and the coil of the relay 44 to the line 41 is connected a normally-open contactor 47 of the relay 44. Also connected from the line 41 to the line 42 is a normally-open contactor 48 of the relay 44, the normally-open contactor 38, and the coil of the relay 46 in series with each other and in the order named. The line 41 is connected to a point between the contactor 38 and the coil of the relay 46 by a normally-open contactor 49 of the relay 46 and the normally-closed contactor 40 in series. One output terminal of the photocell apparatus 28 is connected to an input terminal of the electronic counter 34; the other terminal of the photocell apparatus is connected through a pulse transmission interrupting switch such as normally-open contactor 50 of the relay 46 to the other input terminal of the counter.

The operation of the apparatus will now be understood in view of the above description. The roll stand 17 is driven by the motor 18 and it rolls and forms the product 15. The product passes along the approach table 14 and is centered on the rolls 16. The uppermost portion of the product is engaged by the measuring roll 19 which is driven at a peripheral speed equal to the linear speed of the product. The product strikes the flag 74 and enters the shear; the actuation of the flag 74 starts the shear cycle, as is well known. The knives 13 are rotated and eventually meet and cut the product; at the same time, the cams 37 and 39 are rotated at the same speed as the knives. The product moves out of the shear in pieces of a preselected length and passes over the back-shear table 29 for further treatment. Now, the rotation of the measuring roll also rotates the disc 26. Let us suppose that the disc has been selected so that one notch passes over a radial reference line for every $\frac{1}{10}$ of an inch of product which passes under the measuring roll. In that case, a beam of light is permitted to pass from the source 27 to the photocell apparatus 28 through a notch for every $\frac{1}{10}$ of an inch of product passing under the measuring roll. These light pulses of short duration fall on the light-sensitive element of the photocell apparatus and cause it to emit electrical pulses of similar duration. These electrical pulses are amplified and appear on the output terminals of the photocell apparatus. When the contactor 50 is closed, the output terminals of the photocell apparatus are directly connected to the input terminals of the counter 34. The counter adds up the number of pulses which it receives and the total appears on its face. If the disc is selected as recited above, the counter will always show the number of tenths of an inch of product which have passed under the measuring roll since the counter was re-set and the connection with the photocell apparatus completed. The indicator on the face of the counter can be arranged to indicate the length in feet and inches, if so desired.

It is neither necessary nor desirable to permit the counter to register the total length of product which has passed through the shear; what is needed is a registration of the length of the individual pieces. For that reason, provision is made for re-setting the counter after every piece by pressing the re-set button 52. Let us assume that the counter has been re-set to register zero and the relay 46 is deenergized so that the contactor 50 is open and the photocell apparatus is not operatively connected to the counter. The operator pushes the starter switch 43. This energizes the relay 44. The energization of the relay 44 closes the contactor 47 so that it holds the relay in energized condition even when the switch 43 is released. It also closes the contactor 48. Since the contactor 38 is open during all of the cycle except when the knives 13 are in cutting position, a circuit is completed from line 41 to line 42 through the coil of the relay 46 only when the knives reach cutting position. The energization of the relay 46 at that time closes the holding contactor 49, so that the relay 46 remains energized irrespective of the condition of the contactors 48 and 38. The energization of the relay 46 also opens the contactor 45 in the holding circuit of the relay 44 and causes the latter relay to drop out.

The holding circuit of the relay 46 is completed because the contactor 40 closes immediately after the cutting portion of the knife cycle. The energization of the relay 46 also closes the contactor 50 and it remains closed until the shear reaches the cutting portion of its cycle again when the cam 39 opens the contactor 40 and causes the relay 46 to drop out and open the contactor 50. During the period that the contactor 50 is closed, the counter 34 is totaling and registering the number of tenths of an inch of product which have passed under the measuring roll. Since the contactor 50 closes at the cut and opens again at the cut, the counter registers the length of product between cuts, which is the desired result. The shear cycle can, then, be adjusted to result in a desired length of cut. If the operator presses the starter switch 43 continuously, the counter will totalize successive cut lengths of product. However, usually this would be neither necessary nor desirable.

Figure 4:
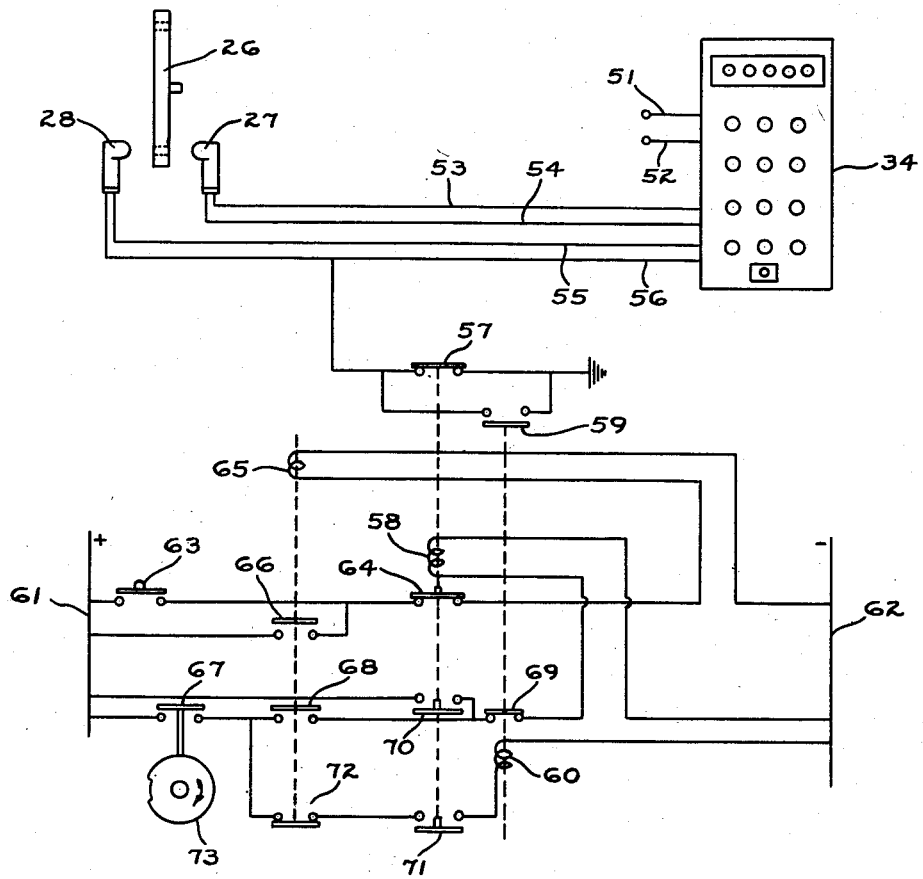
Figure 4 is a schematic view of a modification of the electrical apparatus.

Referring next to Figure 4, which shows a modified version of the electrical apparatus, the disc 26 is shown in use in conjunction with the light source 27, the photocell apparatus 28, and the counter 34. The counter is connected by leads 51, 52 to a source of 115 volt, 60 cycle current, not shown. The light source is connected by leads 53 and 54 to the counter, thereby receiving its power. The photocell apparatus is connected to the input terminals of the counter 34 by means of leads 55 and 56. The lead 55 connects one side of the photocell apparatus output to a counter terminal, but the intermediate portion of the lead 56 is connected to ground through a normally-closed contactor 57 of a relay 58. Across the contactor 57 is connected a normally-open contactor 59 of a relay 60. Between two direct-current power lines 61 and 62 are connected a normally-open measure push-button switch 63, a normally-closed contactor 64 of the relay 58, and the coil of a relay 65 in series with each other and in the order named. The line 61 is connected to a point intermediate of the switch 63 and the contactor 64 by a normally-open contactor 66 of the relay 65. From the line 61 to the line 62 are connected a shear limit switch 67, a normally open contactor 68 of the relay 65, a normally-closed contactor 69 of the relay 60, and the coil of the relay 58 in series and in the order named. From the line 61 to the common point shared by the contactor 68 and the contactor 69 is connected a normally-open contactor 70 of the relay 58. The line 62 is connected to the common point shared by the limit switch 67 and the contactor 68 by the coil of the relay 60, a normally-open contactor 71 of the relay 58, and a normally-closed contactor 72 of the relay 65 in series and in the order named. The relay 65 is of the well-known time-delay type; that is to say, its contactors are not released from actuated condition until a predetermined time interval, i. e. ¼ of a second, after current stops flowing in the line in which the relay lies. The time interval that the contactor 72 must be open, i. e., the time interval between the initial actuation of the relay 65 and its dropping out, must be greater than the maximum period during which the contactor 67 of the limit switch 73 is closed. Since the maximum closed time of the contactors 67 of the limit switch 73 is dependent on speed of shear, the time delay of the relay 65 is selected for closed time of contactors 67 at the lowest planned speed of the shear; this must also be less than the total open time of the limit switch at the highest planned speed. For purposes of simplicity, this relay is shown merely as a coil; however, it is to be understood that the relay may consist of an electronic circuit in the well-known manner. The shear limit switch 67 is actuated by a cam 73 geared to the shear, the cam being so formed as to close the switch momentarily at moment of cut.

In the operation of the apparatus shown in Figure 4, the photocell apparatus 28 is connected to ground through the contactor 57. When the operator wishes to determine the lengths of material being cut by the shear, he presses the push-button switch 63. Immediately, the relay 65 closes the contactors 66 and 68 and opens the contactor 72. The closing of the contactor 66 holds the relay 65 in its actuated condition. The closing of the contactor 68 places the apparatus in such a condition that the closing of the switch 67 by the cam 73 at the start of the shear cut causes current to pass through the coil of the relay 58 and actuate it. The actuation of the relay 58 opens the contactors 57 and 64 and closes the contactors 70 and 71. The opening of the contactor 57 causes the pulses originating in the photocell apparatus 28 to be impressed and recorded on the counter 34. The closing of the contactor 70 causes the relay 58 to be held in actuated condition irrespective of the subsequent opening of the shear limit switch 67. The opening of the contactor 64 interrupts the current flowing in the line in which lies the relay 65; after the predetermined time interval for which it has been set, the relay returns to its non-actuated condition. This closes the contactor 72 which, with the closing of the contactor 71, will permit current to flow in the coil of the relay 60 at the next closing of the limit switch 67 or, in other words, at the time of the start of the next shear cut. The actuation of the relay 60 closes the contactor 59, connecting the photocell apparatus to ground so that pulses originating therein are not recorded by the counter 34. The actuation of the relay 60 also opens the contactor 69, thus causing the relay 58 to drop out and close the contactor 57. The apparatus is now in its original condition, having admitted pulses to the counter 34 for the time interval between two successive shear cuts.

While certain novel features of the invention have been shown and described and are pointed out in the annexed claims, it will be understood that various omissions, substitutions and changes in the forms and details of the device illustrated and in its operation may be made by those skilled in the art without departing from the spirit of the invention.

The invention having been thus described, what is claimed as new and desired to secure by Letters Patent is:

1. An apparatus for measuring lengths of rolling mill product resulting from the cutting action of a shear comprising a measuring roll arranged to contact and be driven by the product, a pulse generator including a rotatable disk having apertures regularly arranged about the axis of rotation connected to the roll to produce electrical pulses in accordance with the rotation of the roll, an electronic pulse counter electrically connected to the generator for indicating the total number of pulses received therefrom, switches connected to the shear and interposed between the generator and the counter for limiting the transmission of pulses from the generator to the counter to the time interval between two consecutive cutting instants, a normally-open starter switch circuit interposed between the generator and the counter, a holding circuit for maintaining the starter switch circuit in closed condition, and cam-actuated switch means for rendering the holding circuit inoperative at the second of the said cutting instants.

2. An apparatus for measuring lengths of rolling mill product produced by a shear comprising a measuring roll arranged to contact and be driven by the product, a notched disk connected to the roll and driven thereby, a light source and a photocell apparatus so mounted relative to the disk that a light beam originating in the source is received by the photocell apparatus only when a notch in the disk is situated therebetween, the photocell emitting electrical pulses in response to the intermittent passage of the light beam thereto, an electronic pulse counter connected electrically to the photocell apparatus for indicating the total number of pulses received therefrom, switches connected to the shear and interposed between the photocell and the counter for limiting the transmission of pulses from the photocell to the counter to the time interval between two consecutive cutting instants, a normally-open starter switch circuit interposed between the photocell and the counter, a holding circuit for maintaining the starter switch circuit in closed condition, and cam-actuated switch means for rendering the holding circuit inoperative at the second of the said two cutting instants.

3. An apparatus for measuring lengths of rolling mill product produced by a shear comprising a measuring roll arranged to contact and be driven by the product, a disk connected to the roll and driven thereby, the disk having openings arranged about its periphery at predetermined equal intervals, a light source and a photocell apparatus so mounted relative to the disk that a light beam originating in the source is received by the photocell apparatus only when an opening in the disk is situated therebetween, the photocell apparatus emitting electrical pulses in response to the intermittent passage of the light beam thereto, an electronic pulse counter connected electrically to the photocell apparatus for indicating the total number of pulses received therefrom, switches connected to the shear and interposed between the photocell and the counter for limiting the transmission of pulses from the photocell to the counter to the time interval between two consecutive cutting times, a normally-open starter switch circuit interposed between the photocell and the counter, a holding circuit for maintaining the starter switch circuit in closed condition, and cam-actuated switch means for rendering the holding circuit inoperative at the second of the said two cutting times.

4. An apparatus for measuring lengths of rolling mill product produced by a shear comprising a measuring roll arranged to contact and be driven by the product, a notched disk connected to the roll and driven thereby, a light source and a photocell apparatus so mounted relative to the disk that a light beam originating in the source is received by the apparatus only when a notch in the disk is situated therebetween, the photocell apparatus emitting electrical pulses in response to the intermittent passage of the light beam thereto, an electronic pulse counter connected electrically to the photocell apparatus for indicating the total number of pulses received therefrom, a relay having a normally-open contactor interposed between the photocell and the counter for limiting the transmission of pulses from the generator to the counter to the time interval between two cutting instants, a first limit switch operated by the shear for energizing the said relay at a first cutting time, a second limit switch operated by the shear for deenergizing the relay at the cutting time following the first cutting time, a normally-open starter switch circuit interposed between the photocell and the counter which, when closed, permits the energization of the relay by the first limit switch, a holding circuit for maintaining the starter switch circuit in closed condition, and cam-actuated switch means for rendering the holding circuit inoperative at the time of the operation of the said second switch.

5. An apparatus for measuring the lengths of rolling mill product produced by a shear comprising a measuring roll adjacent the shear arranged to contact and be driven by the product, a pulse generator including a rotatable disk having apertures regularly arranged about the axis of rotation connected to the roll to produce electrical pulses in accordance with the rotation of the roll, an electronic pulse counter connected to the generator for indicating the total number of pulses received therefrom, a relay having a normally-open contactor for limiting the transmission of pulses from the generator to the counter to the time interval between two consecutive cutting items, a first limit switch operated by the shear for energizing the said relay at a first cutting time, a second limit switch operated by the shear for deenergizing the relay at the cutting time following the first cutting time, a normally-open starter switch circuit interposed between the generator and the counter which, when closed, permits the energization of the relay by the first limit switch, a holding circuit for maintaining the starter switch circuit in closed condition, and cam-actuated switch means for rendering the holding circuit inoperative at the time of operation of the said second switch.

6. An apparatus for measuring the lengths of moving rolling mill product as determined by a shear comprising a measuring roll mounted to contact and be rotated by the moving product, a pulse generator driven by the roll to produce electrical pulses in accordance with the rotation of the roll, an electronic pulse counter connected electrically to the generator for indicating the total number of pulses received therefrom, a normally-open contactor of a relay for limiting the transmission of pulses from the generator to the counter to the time interval between two consecutive cutting times, a first limit switch operated by the shear for energizing the said relay at a first cutting time, a second limit switch operated by the shear for deenergizing the relay at the cutting time following the first cutting time, a normally-open starter switch circuit interposed between the generator and the counter, which, when closed, permits the energization of the relay by the first limit switch, a holding circuit for maintaining the starter switch circuit in closed condition, and cam-actuated switch means for rendering the holding circuit inoperative at the time of operation of the said second switch.

References Cited in the file of this patent

UNITED STATES PATENTS

| | | |
|---|---|---|
| 1,947,399 | Umansky | Feb. 13, 1934 |
| 2,294,566 | Malm et al. | Sept. 1, 1942 |
| 2,539,206 | Robinson | Jan. 23, 1951 |
| 2,557,450 | Mentzel | June 19, 1951 |
| 2,647,323 | Johnson et al. | Aug. 4, 1953 |